United States Patent
Bajko

(10) Patent No.: US 10,051,585 B2
(45) Date of Patent: Aug. 14, 2018

(54) METHODS, APPARATUSES AND COMPUTER PROGRAM PRODUCTS FOR PROVIDING TEMPORAL INFORMATION

(75) Inventor: Gabor Bajko, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 499 days.

(21) Appl. No.: 13/054,751

(22) PCT Filed: Jul. 16, 2008

(86) PCT No.: PCT/US2008/070238
§ 371 (c)(1),
(2), (4) Date: Feb. 28, 2011

(87) PCT Pub. No.: WO2010/008388
PCT Pub. Date: Jan. 21, 2010

(65) Prior Publication Data
US 2011/0149938 A1     Jun. 23, 2011

(51) Int. Cl.
*H04W 56/00*     (2009.01)

(52) U.S. Cl.
CPC .................................. *H04W 56/00* (2013.01)

(58) Field of Classification Search
CPC ..................................................... H04W 56/00
See application file for complete search history.

(56) References Cited

U.S. PATENT DOCUMENTS

| | | | |
|---|---|---|---|
| 2003/0058834 A1* | 3/2003 | Soulie et al. ................. | 370/350 |
| 2004/0243846 A1* | 12/2004 | Aboba .................. | H04W 12/06 |
| | | | 726/4 |
| 2005/0021781 A1* | 1/2005 | Sunder et al. ................ | 709/229 |
| 2007/0242645 A1 | 10/2007 | Stephenson et al. | |
| 2007/0243888 A1* | 10/2007 | Faccin ......................... | 455/461 |
| 2008/0032736 A1* | 2/2008 | Bari et al. .................. | 455/552.1 |
| 2009/0010399 A1* | 1/2009 | Kim et al. ...................... | 379/45 |
| 2010/0031314 A1* | 2/2010 | Rydnell ............ | H04W 36/0072 |
| | | | 726/3 |

FOREIGN PATENT DOCUMENTS

| | | |
|---|---|---|
| EP | 1032186 A | 8/2000 |
| EP | 1895409 A | 3/2008 |
| WO | 2007080495 A | 7/2007 |

OTHER PUBLICATIONS

Author: Moskowitz Title: WLAN testing reports Date: Dec. 2003 Publisher: ICSA labs.*

(Continued)

*Primary Examiner* — Rina C Pancholi
(74) *Attorney, Agent, or Firm* — Mintz Levin Cohn Ferris Glovsky and Popeo, P.C.

(57) ABSTRACT

An apparatus for providing temporal information may include a processor. The processor may be configured to provide a request for receipt of temporal information associated with a wireless communication access point, and receive a response to the request prior to either or both of authentication of a device providing the request by the wireless communication access point or association of the device with the wireless communication access point in which the response includes the temporal information.

15 Claims, 5 Drawing Sheets

(56) References Cited

OTHER PUBLICATIONS

International Search Report and Written Opinion of the International Searching Authority for corresponding Patent Cooperation Treaty Application No. PCT/US2008/070238 dated Jul. 16, 2008, 10 pages.

IEEE, "IEEE Standard for Information technology—Telecommunications and information exhange between systems—Local and metropolitan area networks—Specific requirements, Part 11: Wireless LAN Medium Access Control (MAC) and Physical Layer (PHY) Specifications," IEEE Computer Society, IEEE Std 802.11-2007, Jun. 12, 2007.

IEEE, "IEEE Standard for Information Technology—Telecommunication and information exchange between systems—Local and metropolitan area network—Specific requirements—Part 11: Wireless LAN Medium Access Control (MAC) and Physical Layer (PHY) specifications: Amendment 8: IEEE 802.11 Wireless Network Management," IEEE Computer Society, IEEE Std 802.11v-2011, Feb. 9, 2011.

IEEE, "IEEE Standard for Information technology—Telecommunications and information exchange between systems—Local and metropolitan area networks—Specific requirements—Part 11: Wireless LAN Medium Access Control (MAC) and Physical Layer (PHY) Specifications: Amendment 9: Interworking with External Networks," IEEE Computer Society, IEEE Std 802.11u-2011, Feb. 25, 2011.

\* cited by examiner

METHODS, APPARATUSES AND COMPUTER PROGRAM PRODUCTS FOR PROVIDING TEMPORAL INFORMATION

RELATED APPLICATION

This application was originally filed as PCT Application No. PCT/US2008/070238 filed Jul. 16, 2008.

TECHNOLOGICAL FIELD

Embodiments of the present invention relate generally to communications technology and, more particularly, relate to apparatuses, methods and computer program products for enabling devices to access temporal information.

BACKGROUND

Communication devices are becoming increasingly ubiquitous in the modern world. In particular, mobile communication devices seem to be particularly popular with people of all ages, socio-economic backgrounds and sophistication levels. Accordingly, users of such devices are becoming increasingly attached to their respective mobile communication devices. Whether such devices are used for calling, emailing, sharing or consuming media content, gaming, navigation or various other activities, people are more connected to their devices and consequently more connected to each other and to the world at large.

Mobile communication devices can often be very valuable in situations where people are traveling. Whether such devices are used for getting directions, entertainment, becoming acquainted with local businesses, points of interest, or culture via the Internet, or communicating with colleagues or friends, users increasingly rely on their mobile communication devices for all types of information. Various different communication standards and devices have been developed to provide a robust capability for users to remain in communication under many circumstances and in widely varying locations.

Despite the advancements relating to enhancing communication capabilities, there may be difficulties in some situations regarding obtaining information due to access restrictions with respect to establishing communication with a network via a local access point (AP). For example, in many cases, access to the AP is restricted. In this regard, there is often a key that is required to get access to the network (including the AP) (e.g., in order to access the Internet, a next step for access may be required) and therefore also to the resources behind the AP. As such, difficulties may be encountered in relation to obtaining certain types of information.

BRIEF SUMMARY OF EXEMPLARY EMBODIMENTS

A method, apparatus and computer program product are therefore provided that may enable devices to access temporal information such as, for example, time, date, and/or time zone information. In an exemplary embodiment, date, time and time zone configuration may be provided for devices such as WiFi devices (e.g., Institute of Electrical and Electronics Engineers (IEEE) 802.11 compliant devices). Accordingly, an exemplary embodiment of the present invention may enable a mobile terminal to access temporal information for configuration prior to being granted access to the network behind an access point.

In one exemplary embodiment, a method of providing temporal information is provided. The method may include providing a request for receipt of temporal information associated with a wireless communication access point and receiving a response to the request prior to either or both of authentication of a device providing the request by the wireless communication access point or association of the device with the wireless communication access point in which the response includes the temporal information.

In another exemplary embodiment, a computer program product for providing temporal information is provided. The computer program product may include at least one computer-readable storage medium having computer-executable program code portions stored therein. The computer-executable program code portions may include a first program code instructions and second program code instructions. The first program code instructions may be for providing a request for receipt of temporal information associated with a wireless communication access point. The second program code instructions may be for receiving a response to the request prior to either or both of authentication of a device providing the request by the wireless communication access point or association of the device with the wireless communication access point in which the response includes the temporal information.

In another exemplary embodiment, an apparatus for temporal information is provided. The apparatus may include a processor that may be configured to provide a request for receipt of temporal information associated with a wireless communication access point, and receive a response to the request prior to either or both of authentication of a device providing the request by the wireless communication access point or association of the device with the wireless communication access point in which the response includes the temporal information.

In one exemplary embodiment, a method of providing temporal information is provided. The method may include receiving a request for temporal information associated with a wireless communication access point and providing a response to the request prior to either or both of authentication of a device providing the request by the wireless communication access point or association of the device with the wireless communication access point in which the response includes the temporal information.

In another exemplary embodiment, a computer program product for providing temporal information is provided. The computer program product may include at least one computer-readable storage medium having computer-executable program code portions stored therein. The computer-executable program code portions may include a first program code instruction and a second program code instruction. The first program code instructions may be for receiving a request for temporal information associated with a wireless communication access point. The second program code instructions may be for providing a response to the request prior to either or both of authentication of a device providing the request by the wireless communication access point or association of the device with the wireless communication access point in which the response includes the temporal information.

In another exemplary embodiment, an apparatus for providing temporal information is provided. The apparatus may include a processor that may be configured to receive a request for temporal information associated with a wireless communication access point and provide a response to the request prior to either or both of authentication of a device providing the request by the wireless communication access point or association of the device with the wireless communication access point in which the response includes the temporal information.

In yet another exemplary embodiment an apparatus for providing temporal information is provided. The apparatus may include means for receiving a request for temporal information associated with a wireless communication access point and means for providing a response to the request prior to either or both of authentication of a device providing the request by the wireless communication access point or association of the device with the wireless communication access point in which the response includes the temporal information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
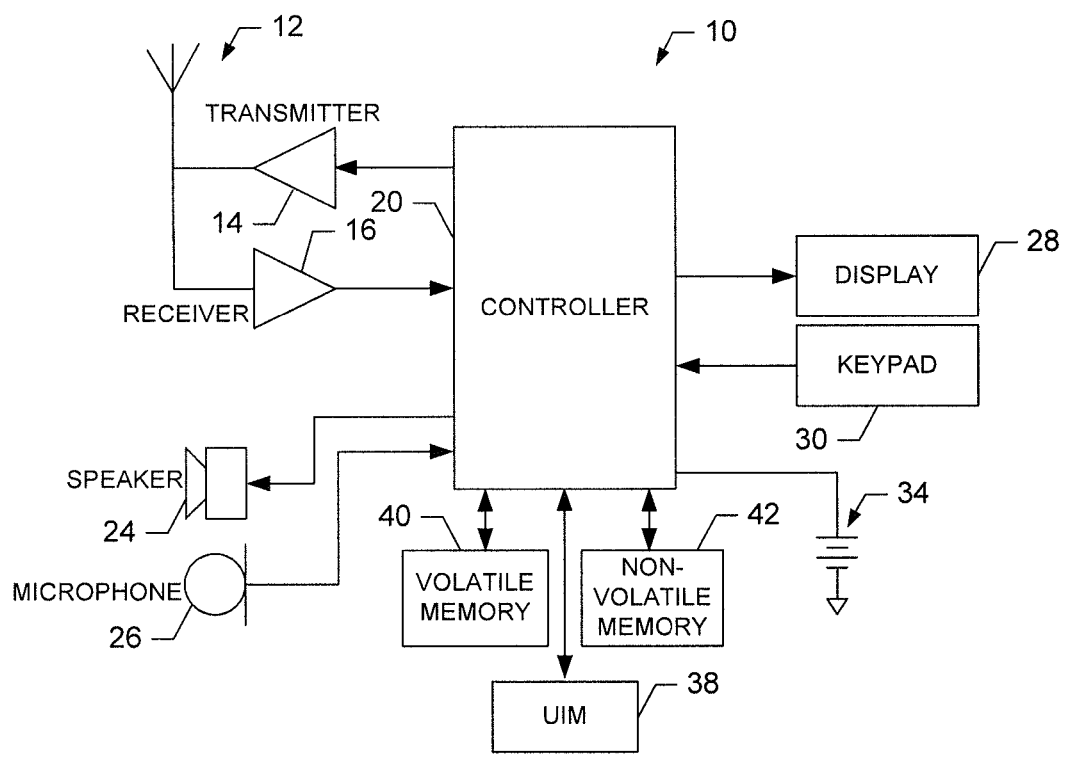
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As discussed above, traveling users may face challenges in connection with establishing communication in a new location. In recognition of the desire to provide users with a better user experience, even when traveling, efforts are being made to ensure that a user attempting to utilize a mobile communication device (e.g., a mobile terminal) in a new location is not overwhelmed by complex or voluminous operations being required to establish communications. For example, a user attempting to use his or her laptop in a new location likely would prefer to avoid having to respond to a long list of service set identifiers (SSIDs) that identify available access points to which the user can connect, and instead may like to receive a listing of available networks, services and/or conditions for access. In order to provide more seamless access for traveling users in the context of IEEE 802.11 technologies such as WiFi, the 802.11u specification has been proposed.

The 802.11 specification generally assumes a user is pre-authenticated (or associated when authentication is not required,—eg when the AP is open access—) to use the network. The 802.11u specification relates, among other things, to situations where the user is not pre-authenticated. In this regard, for example, 802.11u may provide a user with access to the network based on the user's relationship with an external network. Alternatively, the user may be enabled to utilize certain services prior to authorization (e.g., emergency services, service advertisement, or the like). The 802.11u specification defines various different communication states for mobile terminals attempting to communicate with an AP. In this regard, for example, a pre-association state may refer to a period prior to association of the mobile terminal with the AP. In other words, a device in the pre-association state may not have completed a successful link layer association with the AP. Since authentication typically occurs after association, a device in the pre-association state has not yet been authenticated and is also therefore "pre-authenticated". Meanwhile, other states may also exist in which, for example, association between the mobile terminal and the AP may have been successfully completed, but higher layer authentication may not yet have been performed or the mobile terminal may not have credentials to enable authentication. One such state, an associated state, may be defined in which a device has successfully completed association, but not yet completed authentication. Another available state may include an authenticated state in which association between the mobile terminal and the AP may have been successfully completed, and authentication may also be complete to thereby enable full access to the network behind the AP.

In general, devices that are in the pre-association state and the associated state may be considered to be in a pre-authenticated state. A mechanism has been defined to enable a mobile terminal to query the AP in the pre-authenticated state in the form of a Generic Advertisement Service (GAS). The GAS has two variants including native GAS and non-native GAS. Native GAS typically applies to situations where a mobile terminal queries the AP for locally configured data, while the non-native GAS may be used when data requested is not available locally, but the AP may contact an external database to get the requested data. Conventional mechanisms do not provide a mechanism for a mobile terminal to access temporal information associated with a location of the AP. Thus, for example, temporal information such as date, time and time zone at the location of the AP may currently not be acquired by the mobile terminal when the mobile terminal is in a pre-authenticated state.

Some embodiments of the present invention may further provide a user with an ability to access certain temporal information (e.g., date, time and/or time zone) prior to user authentication or authorization with the local AP. Of note, embodiments of the present invention may also provide the user with the ability to access the temporal information in the authenticated state via the same mechanisms provided that may operate in the pre-authenticated state. In an exemplary embodiment, native GAS query and response information elements may be provided to provide temporal information to a pre-authenticated device. Thus, for example, a mobile terminal switched on may find a local beacon (e.g., an 802.11 beacon) and request local date, time and/or time zone from the AP in order to configure itself in this regard before becoming fully operational. As such, for example, a device need not necessarily possess valid credentials for a specific SSID in order to get temporal information from the specific SSID. Thus, devices in the pre-authenticated state (e.g., pre-associated or associated) or the authenticated state may receive temporal information.

Figure 2:
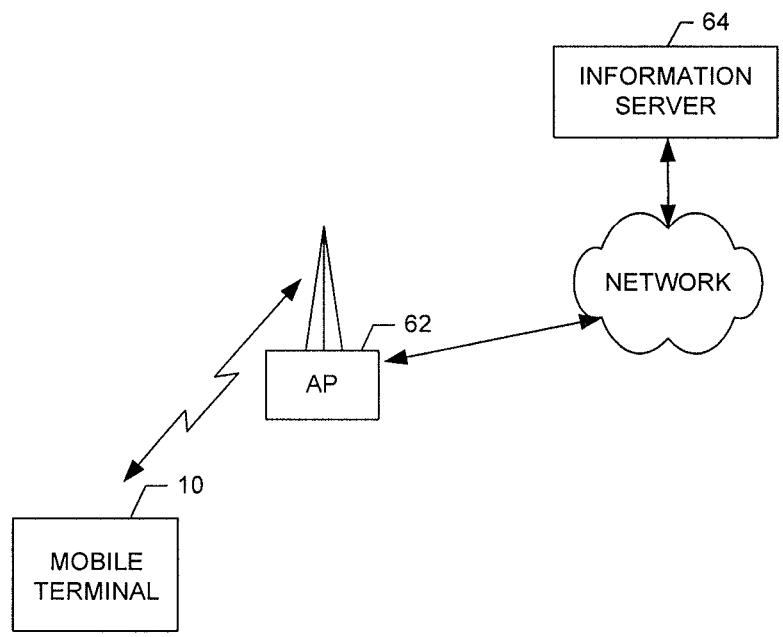
FIG. 2 is a schematic block diagram of a wireless communications system according to an exemplary embodiment of the present invention.

FIGS. 1 and 2 below will describe examples of a device and system in which embodiments of the present invention may be practiced. However, it should be understood that embodiments may also be practiced in other communication contexts and with other devices and systems beyond those specifically mentioned below. Moreover, although the remaining figures and description may be primarily discussed in connection with an embodiment practiced in the context of WiFi devices, it should be understood that embodiments of the present invention may also be practiced in connection with other devices.

An exemplary embodiment of the invention will now be described with reference to FIG. 1, which illustrates a block diagram of a mobile terminal 10 that may benefit from exemplary embodiments of the present invention. It should be understood, however, that a mobile terminal as illustrated and hereinafter described is merely illustrative of one type of mobile terminal that may benefit from some embodiments of the present invention and, therefore, should not be taken to limit the scope of embodiments of the present invention. Several types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, can readily employ embodiments of the present invention.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals may include signaling information in accordance with the IEEE 802.11 standard and possibly also other standards such as an air interface standard of an applicable cellular system. In this regard, the mobile terminal 10 may be capable of operating with one or more air interface standards, communication protocols, modulation types, and access types. For example, the mobile terminal 10 may be capable of communication in a wireless local area network (WLAN) or other communication networks.

It is understood that the apparatus, such as the controller 20, may include circuitry for implementing, among others, audio/video and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 are allocated between these devices according to their respective capabilities. The controller 20 thus may also include the functionality to encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional web browser. The connectivity program may then allow the mobile terminal 10 to transmit and receive web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a microphone 26, a display 28, and a user input interface, which may be operationally coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include numeric (0-9) and related keys (#, *), and other hard and soft keys used for operating the mobile terminal 10. Alternatively, the keypad 30 may include a QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories can store any of a number of pieces of information, and data, used by the mobile terminal 10 to implement the functions of the mobile terminal 10.

FIG. 2 is a schematic block diagram of a wireless communications system according to an exemplary embodiment of the present invention. Of note, the wireless communication system of FIG. 2 may include capabilities for interface with multiple wireless communication technologies (e.g., cellular technologies and 802.11 technologies). However, devices employing embodiments of the present invention need not necessarily be capable of communication via multiple wireless communication technologies but instead may only be capable of communication via one wireless communication technology such as WiFi. Accordingly, FIG. 2 is merely exemplary of a system that could support communication via multiple wireless communication technologies and should not be considered limiting.

Referring now to FIG. 2, an illustration of one type of system that would benefit from embodiments of the present invention is provided. The system includes a plurality of network devices. As shown, one or more mobile terminals 10 may each include an antenna or antennas for transmitting signals to and for receiving signals from a base site, which could be, for example a base station that is a part of one or more cellular or mobile networks or an access point (e.g., access point 62) that may be coupled to a data network 58, such as a local area network (LAN), a metropolitan area network (MAN), and/or a wide area network (WAN), such as the Internet. In turn, other devices such as processing elements (e.g., personal computers, server computers or the like) can be coupled to the mobile terminal 10 via the network 58. By directly or indirectly connecting mobile terminals 10 and other devices to the network 58, the mobile terminal 10 may communicate with the other devices or other mobile terminals, for example, according to numerous communication protocols including Hypertext Transfer Protocol (HTTP) and/or the like, to thereby carry out various functions of the mobile terminals 10.

As indicated above, although not necessary, in some embodiments, the network 58 may be capable of supporting communication in accordance with any one or more of a number of first-generation (1G), second-generation (2G), 2.5G, third-generation (3G), 3.9G, fourth-generation (4G) mobile communication protocols or the like. Furthermore, although not shown in FIG. 2, the mobile terminal 10 and the AP 62 may communicate in accordance with, for example, RF, BT, IrDA or any of a number of different wireline or wireless communication techniques, including LAN, WLAN, Worldwide Interoperability for Microwave Access (WiMAX), ultra-wide band (UWB) techniques and/or the like. However, one exemplary embodiment may only support a single protocol, such as 802.11 radio (WiFi) protocol.

In an exemplary embodiment, content or data may be communicated over the system of FIG. 2 between a mobile terminal, which may be similar to the mobile terminal 10 of FIG. 1, and a network device of the system of FIG. 2 in order to, for example, execute applications or establish communication (for example, for purposes of content, data or information sharing) between the mobile terminal 10 and other mobile terminals or network devices. As such, it should be understood that the system of FIG. 2 need not be employed for communication between mobile terminals or between a network device and the mobile terminal, but rather FIG. 2 is merely provided for purposes of example.

In an exemplary embodiment, the network 58, may be, for example, a wireless local area network (WLAN) employing 802.11 communication techniques and the mobile terminal 10 may be capable of communication with the network 58 via AP 62, if properly authenticated. The AP 62 may be configured to communicate with the mobile terminal 10 in accordance with a wireless communication protocol (e.g., 802.11). The network 58 may include or be in communication with various different devices or servers including, for example, an information server 64. The information server 64 may be, for example, an information server according to the IEEE 802.21 specification.

In accordance with an exemplary embodiment, a management information base (MIB) value or variable may be defined for the AP 62 corresponding to temporal information. Thus, for example, a MIB date variable, a MIB time variable and/or a MIB time zone variable, which may be, e.g., in universal time constant (UTC) format or ISO 8601 or TZ POSIX String format (IEEE 1003.1), may be defined by the MIB value. In an exemplary embodiment, the MIB value may be employed in connection with native GAS protocol to enable the mobile terminal 10 to download any or all of the date, time, and time zone, while the mobile terminal 10 is in the pre-associated state, the associated state or the authenticated state with respect to the AP 62. In other words, in at least some instances, the MIB value may enable the mobile terminal 10 to communicate with the AP 62 while in a pre-authenticated state in order to receive temporal information for the local area of the AP 62. Thus, for example, in some cases the mobile terminal 10 may be enabled to synchronize with the correct time and date for the current time zone even before the mobile terminal 10 is granted full access to any communication assets other than the AP 62.

A native query protocol is defined, for example, in the 802.11 specification, and may be a mechanism by which a non-AP station (e.g., the mobile terminal 10) can query the AP 62 for locally configured data such that the AP 62 can directly respond to queries without proxying the query to a server in the network 58 or an external network. Accordingly, in an exemplary embodiment, a native query protocol information ID associated with temporal information may be defined. Thus, for example, the mobile terminal 10 may communicate the native query protocol information ID associated with temporal information to the AP 62 while in the pre-association state (or in the associated or authenticated states) in order to request temporal information from the AP 62. The AP 62 may then be enabled to provide the requested temporal information (e.g., time, date, time zone, and/or the like) to the mobile terminal 10.

In some alternative cases, a media independent handover (MIH) information service may be defined in accordance with the IEEE 802.21 specification to support information retrieval from an information repository of the network 58. As another alternative, an advertisement protocol ID for an MIH information service may be used to access information in a server of the network 58. Thus, for example, the AP 62 may access information in the information server 64 in order to retrieve the temporal information for provision to the mobile terminal 10, prior to authorization of the mobile terminal 10. Thus, the mobile terminal 10 may effectively be granted limited access to a network asset (e.g., the information server 64) for the purpose of obtaining temporal information, although such information is actually relayed to the mobile terminal 10 by the AP 62. As an example mechanism for supporting implementation of MIH services as described above, date, time and time zone information may be stored in the information server 64 (e.g., an 802.21 server) along with information identifying the AP 62 (e.g., a media access control (MAC) address of the AP 62).

Thus, according to various alternative embodiments, a mechanism may be provided for defining a query to be provided from a mobile terminal to an AP in order to enable the mobile terminal to access local configuration information associated with the AP including temporal information before the mobile terminal is granted full access to a network behind the AP. In other words, for example, temporal values (e.g., including a MIB date variable, a MIB time variable and/or a MIB time zone variable) may be defined for the AP and the mobile terminal may be enabled to issue a request for information related to the temporal values prior to authentication of the mobile terminal. As such, the mobile terminal 10 may obtain temporal information in the pre-authenticated state (e.g., the pre-associated state and the associated state) and also in the authenticated state.

An exemplary embodiment of the invention will now be described with reference to FIG. 3, in which certain elements of an apparatus for providing temporal information are displayed. The apparatus of FIG. 3 may be employed, for example, on the mobile terminal 10 of FIG. 1 or the AP 62 of FIG. 2. However, it should be noted that the apparatus of FIG. 3, may also be employed on a variety of other devices, both mobile and fixed, and therefore, the present invention should not be limited to application on devices such as those listed above. Alternatively, embodiments may be employed on a combination of devices including, for example, those listed above. Moreover, embodiments of the present invention may be embodied wholly at a single device or by a combination of devices such as when devices are in a client/server relationship. Furthermore, it should be noted that the devices or elements described below may not be mandatory and thus some may be omitted in certain embodiments.

Figure 3:
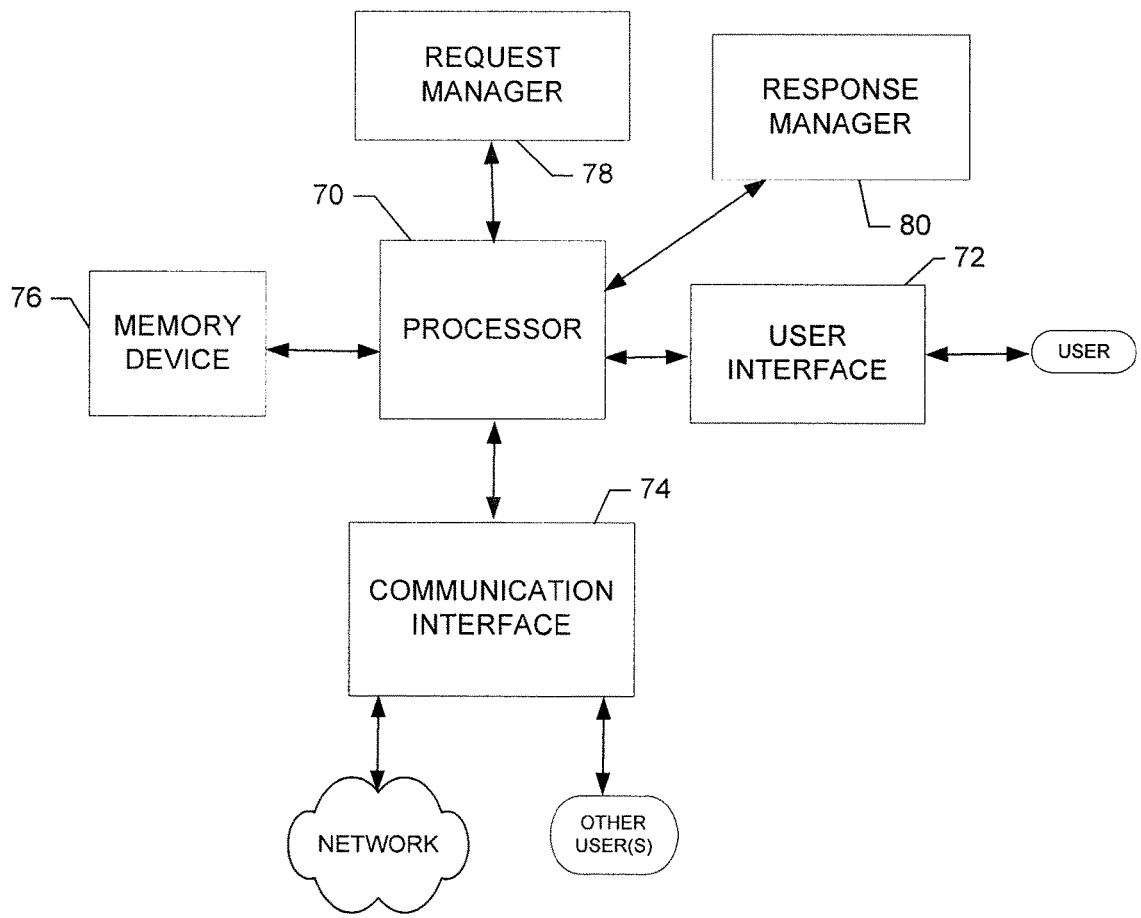
FIG. 3 illustrates a block diagram showing an apparatus for providing temporal information according to an exemplary embodiment of the present invention.

Referring now to FIG. 3, an apparatus for providing temporal information is provided. The apparatus may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, and/or the like. In an exemplary embodiment, the processor 70 may be configured to execute instructions stored in the memory device 76 or otherwise accessible to the processor 70. Meanwhile, the communication interface 74 may be embodied as any device or means embodied in either hardware, software, or a combination of hardware and software that is configured to receive and/or transmit data from/to a network and/or any other device or module in communication with the apparatus. In this regard, the communication interface 74 may include, for example, an antenna and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a touch screen, a display, a microphone, a speaker, or other input/output mechanisms. In an exemplary embodiment in which the apparatus is embodied as a server, access point or some other network devices, the user interface 72 may be limited, or eliminated.

In an exemplary embodiment, the processor 70 may be embodied as, include or otherwise control a request manager 78 and a response manager 80. The request manager 78 and the response manager 80 may each be any means such as a device or circuitry embodied in hardware, software or a combination of hardware and software that is configured to perform the corresponding functions of the request manager 78 and the response manager 80, respectively, as described below.

The request manager 78 may be configured to generate or receive (e.g., dependent upon whether the request manager 78 is embodied at the mobile terminal 10 (e.g., a WiFi capable device) or the AP 62) a message including an indication of a request for temporal information prior to the mobile terminal 10 issuing the request being granted access to the network behind the AP 62 (e.g., when the mobile terminal is in the pre-authenticated state). In some embodiments, the indication may be a native query protocol information ID as described above. As such, the indication may provide a value indicative of a request for temporal information.

The response manager 80 may be configured to generate or receive a response to the message. As such, for example, if the response manager 80 is embodied at the mobile terminal 10, the response manager 80 may be configured to receive a native GAS response information element including temporal information (e.g., time, date and/or time zone information). If, for example, the response manager 80 is embodied at the AP 62, the response manager 80 may be configured to provide the native GAS response information element including temporal information (e.g., time, date and/or time zone information) stored in the memory device 76 of the AP 62. In some embodiments, the temporal information may be stored at a location in the information server 64 and an identity of the AP 62 (e.g., the AP's MAC address) may also be stored in association with the temporal information to enable provision of the temporal information for the AP 62 to the mobile terminal 10.

In some embodiments, when a device such as the mobile terminal 10 initially powers up or otherwise finds itself in a new location for which the device is not configured, the device may initially inquire (e.g., via the request manager 78) as to the services available for one or more SSIDs that are available. An AP associated with one of the SSIDs receiving such an inquiry may respond with an indication of the services offered by the AP. In some embodiments where an MIB value has been defined for temporal information, the AP may indicate that temporal information is available. The device (e.g., via the request manager 78) may then request the temporal information as described above. A response to the request may be handled, as also described above, by the response manager 80. Alternatively, when the mobile terminal 10 powers up, the mobile terminal 10 may be configured to automatically request temporal information from an AP with the strongest signal for from an AP that indicates the availability of temporal information.

Figure 4:
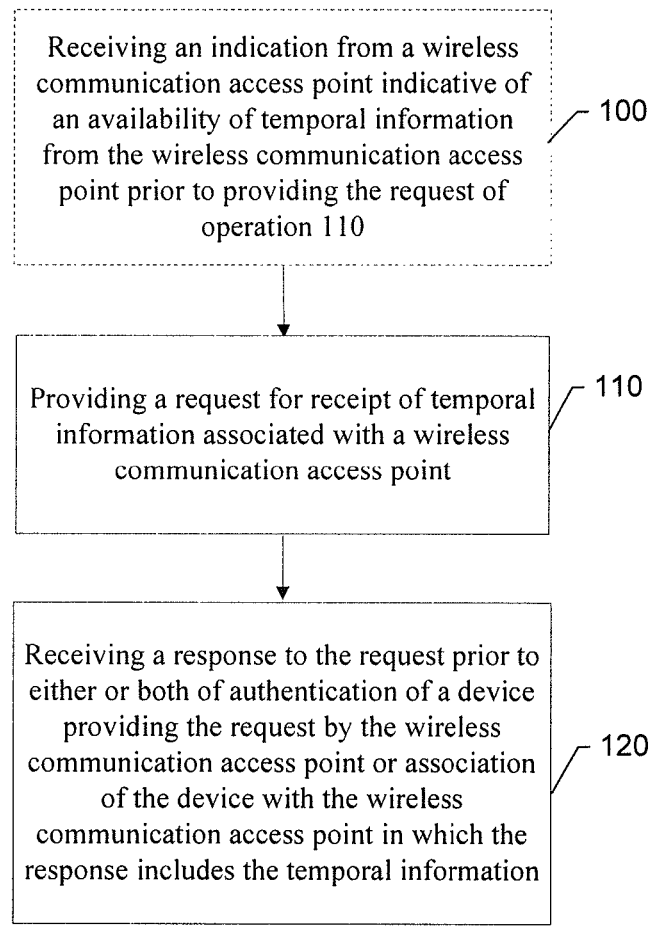
FIG. 4 is a flowchart according to an exemplary method of providing temporal information according to an exemplary embodiment of the present invention.
Figure 5:
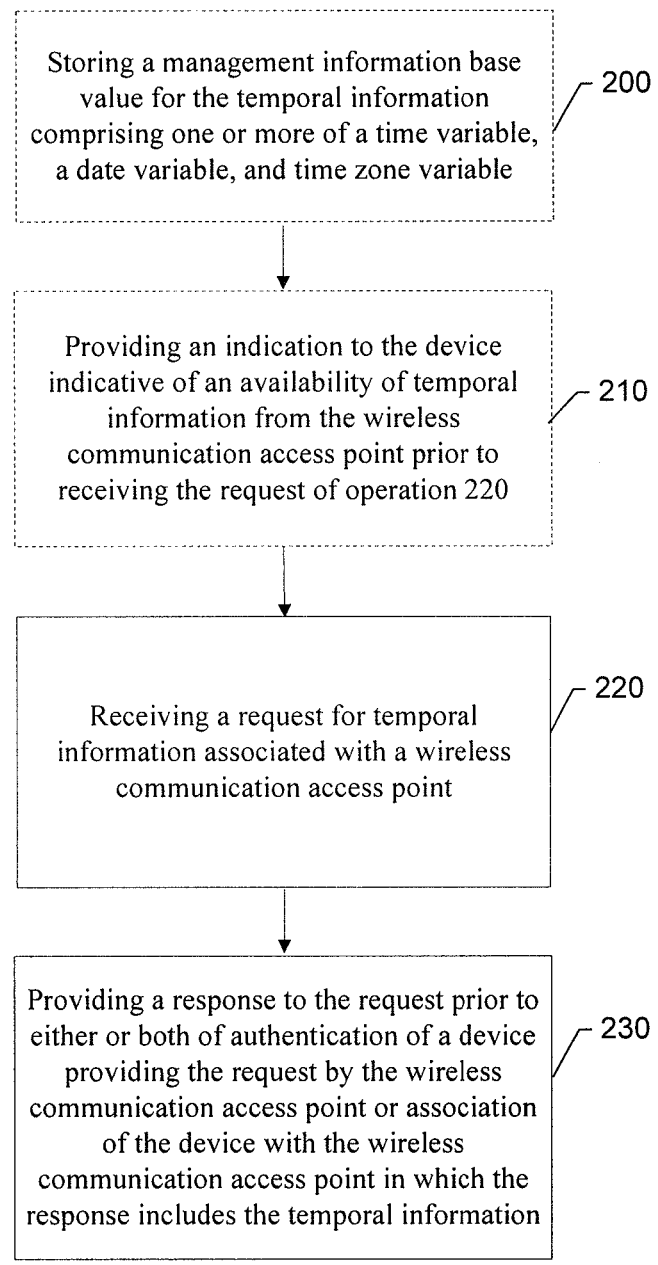
FIG. 5 is a flowchart according to an alternative exemplary method of providing temporal information according to an exemplary embodiment of the present invention.

FIGS. 4 and 5 are flowcharts of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device and executed by a processor (e.g., the processor 70). As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block (s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing temporal information from the perspective of a mobile terminal as provided in FIG. 4 may include providing a request for receipt of temporal information associated with a wireless communication access point at operation 110 and receiving a response to the request prior to either or both of authentication of a device providing the request by the wireless communication access point or association of the device with the wireless communication access point in which the response includes the temporal information at operation 120.

In some embodiments, the method may include further optional operations, an example of which is shown in dashed lines in FIG. 4. In this regard, the method may further include receiving an indication from the wireless communication access point indicative of an availability of temporal information from the wireless communication access point prior to providing the request. In an exemplary embodiment, operation 110 may include providing a native generic advertisement service query requesting the temporal information comprising one or more of time information, date information, and time zone information.

In an exemplary embodiment, an apparatus for performing the method above may include a processor (e.g., the processor 70) configured to perform each of the operations (100-120) described above. The processor may, for example, be configured to perform the operations by executing stored instructions or an algorithm for performing each of the operations. Alternatively, the apparatus may include means for performing each of the operations described above. In this regard, according to an exemplary embodiment, examples of means for performing operations 100 to 120 may include, for example, the request manager 78, the response manager 80, or the processor 70.

Another embodiment of a method for providing temporal information as provided in FIG. 5 may include receiving a request for temporal information associated with a wireless communication access point at operation 220, and providing a response to the request prior to either or both of authentication of a device providing the request by the wireless communication access point or association of the device with the wireless communication access point in which the response includes the temporal information at operation 230.

In an alternative exemplary embodiment, further optional operations may be included, an example of which is shown in dashed lines in FIG. 5. In this regard, the method may further include providing an indication to the device indicative of an availability of temporal information from the wireless communication access point prior to receiving the request at operation 210 or storing a management information base value for the temporal information comprising one or more of a time variable, a date variable, and time zone variable at operation 200.

In an exemplary embodiment, operation 220 may include receiving a native generic advertisement service query requesting the temporal information comprising one or more of time information, date information, and time zone information. In such an embodiment, operation 230 may include accessing the temporal information from an information server via an identification of the wireless communication access point stored in association with the temporal information and relaying the accessed temporal information to the device.

In an exemplary embodiment, an apparatus for performing the method above may include a processor (e.g., the processor 70) configured to perform each of the operations (200-230) described above. The processor may, for example, be configured to perform the operations by executing stored instructions or an algorithm for performing each of the operations. Alternatively, the apparatus may include means for performing each of the operations described above. In this regard, according to an exemplary embodiment, examples of means for performing operations 200 to 230 may include, for example, the request manager 78, the response manager 80, or the processor 70.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
sending, by a user equipment and to a wireless communication access point, a probe request comprising a generic advertisement service query for a probe response comprising timing information related to the wireless communication access point, the timing information comprising local time information associated with the wireless communication access point, local date information associated with the wireless communication access point, and local time zone information associated with the wireless communication access point, wherein the probe request is sent prior to the user equipment association with the wireless communication access point and prior to an authentication request being sent to the wireless communication access point; and receiving, at the user equipment and from the wireless communication access point, the probe response comprising a generic advertisement service response further including the timing information, the probe response received prior to authentication of the user equipment with the wireless communication access point and prior to the association of the user equipment with the wireless communication access point.

2. The method of claim 1, wherein the generic advertisement service query comprises a native generic advertisement service query.

3. The method of claim 1, further comprising: synchronizing a user equipment time, a user equipment date, and a user equipment time zone with the local time information, the local date information, and the local time zone information received from the wireless communication access point.

4. A non-transitory computer-readable storage medium encoded with instructions that, when executed by at least one processor, cause at least the following:

sending, by a user equipment and to a wireless communication access point, a probe request comprising a generic advertisement service query for a probe response comprising timing information related to the wireless communication access point, the timing information comprising local time information associated with the wireless communication access point, local date information associated with the wireless communication access point, and local time zone information associated with the wireless communication access point, wherein the probe request is sent prior to the user equipment association with the wireless communication access point and prior to an authentication request being sent to the wireless communication access point; and receiving, at the user equipment and from the wireless communication access point, the probe response comprising a generic advertisement service response further including the timing information, the probe response received prior to authentication of the user equipment with the wireless communication access point and prior to the association of the user equipment with the wireless communication access point.

5. The non-transitory computer-readable storage medium of claim 4, wherein the generic advertisement service query comprises a native generic advertisement service query.

6. The non-transitory computer-readable storage medium of claim 4, further comprising: synchronizing a user equipment time, a user equipment date, and a user equipment time zone with the local time information, the local date information, and the local time zone information received from the wireless communication access point.

7. An apparatus, comprising:
at least one processor, and
at least one memory including computer program code, the at least one memory and the computer program code configured to, with the at least one processor, cause the apparatus to at least:
send, to a wireless communication access point, a probe request comprising a generic advertisement service query for a probe response comprising timing information related to the wireless communication access point, the timing information comprising local time information associated with the wireless communication access point, local date information associated with the wireless communication access point, and local time zone information associated with the wireless communication access point, wherein the probe request is sent prior to the apparatus association with the wireless communication access point and prior to an authentication request being sent to the wireless communication access point;

receive, from the wireless communication access point, the probe response comprising a generic advertisement service response further including the timing information, the receipt of the probe response occurring prior to authentication of the apparatus with the wireless communication access point and prior to the association of the apparatus with the wireless communication access point.

8. The apparatus of claim 7, wherein the generic advertisement service query comprises a native generic advertisement service query, and wherein the apparatus comprises, or is comprised in, a user equipment.

9. The apparatus of claim 7, wherein the apparatus is further caused to at least synchronize a time at the apparatus, a date at the apparatus, and a time zone at the apparatus with the local time information, the local date information, and the local time zone information received from the wireless communication access point.

10. A method comprising:
receiving, at a wireless communication access point and from a user equipment, a probe request comprising a generic advertisement service query for a probe response comprising timing information related to the wireless communication access point, the timing information comprising local time information associated with the wireless communication access point, local date information associated with the wireless communication access point, and local time zone information associated with the wireless communication access point, wherein the probe request is received prior to the user equipment association with the wireless communication access point and prior to an authentication request being sent to the wireless communication access point; and sending, by the wireless communication access point and to the user equipment, the probe response comprising a generic advertisement service response further including the timing information, the probe response sent prior to authentication of the user equipment with the wireless communication access point and prior to the association of the user equipment with the wireless communication access point.

11. The method of claim 10, wherein the generic advertisement service query comprises a native generic advertisement service query.

12. The method of claim 10, wherein sending the probe response comprises:
accessing the timing information from an information server via an identification of the wireless communication access point; and
relaying the timing information to the user equipment.

13. An apparatus, comprising:
at least one processor, and
at least one memory including computer program code, the at least one memory and the computer program code configured to, with the at least one processor, cause the apparatus to at least:

receive, from a user equipment, a probe request comprising a generic advertisement service query for a probe response comprising timing information related to the apparatus, the timing information comprising local time information associated with the apparatus, local date information associated with the apparatus and local time zone information associated with the apparatus, wherein the probe request is received prior to the user equipment association with the apparatus and prior to an authentication request being sent to the apparatus; and send, to the user equipment, the probe response comprising a generic advertisement service response further including the timing information, the probe response sent prior to authentication of the user equipment with the apparatus and prior to the association of the user equipment with the apparatus.

14. The apparatus of claim 13, wherein the generic advertisement service query comprises a native generic advertisement service query, and wherein the apparatus comprises, or is comprised in, a wireless communication access point.

15. The apparatus of claim 13, wherein the apparatus is further caused to at least:

access the timing information from an information server via an identification of the apparatus; and relay the timing information to the user equipment.

* * * * *